United States Patent
Meriac

(10) Patent No.: US 10,841,278 B2
(45) Date of Patent: Nov. 17, 2020

(54) ZERO LATENCY GATEWAY

(71) Applicant: Arm IP Limited, Cambridge (GB)

(72) Inventor: Milosch Meriac, Cambridge (GB)

(73) Assignee: Arm IP Limited, Cambridge (GB)

( * ) Notice: Subject to any disclaimer, the term of this patent is extended or adjusted under 35 U.S.C. 154(b) by 0 days.

(21) Appl. No.: 15/770,621

(22) PCT Filed: Nov. 8, 2016

(86) PCT No.: PCT/GB2016/053494
§ 371 (c)(1),
(2) Date: Apr. 24, 2018

(87) PCT Pub. No.: WO2017/085463
PCT Pub. Date: May 26, 2017

(65) Prior Publication Data
US 2018/0324146 A1    Nov. 8, 2018

(30) Foreign Application Priority Data

Nov. 17, 2015    (GB) .................................. 1520262.5

(51) Int. Cl.
| | |
|---|---|
| H04L 29/06 | (2006.01) |
| H04W 4/70 | (2018.01) |
| H04W 4/80 | (2018.01) |
| H04W 4/00 | (2018.01) |
| H04L 9/32 | (2006.01) |

(52) U.S. Cl.
CPC ........ H04L 63/0227 (2013.01); H04L 9/3213 (2013.01); H04L 63/1441 (2013.01); H04W 4/00 (2013.01); H04W 4/70 (2018.02); H04W 4/80 (2018.02)

(58) Field of Classification Search
CPC ............. H04L 63/0227; H04L 63/1441; H04L 9/3213; H04W 4/00; H04W 4/70; H04W 4/80
USPC ......................................................... 370/230
See application file for complete search history.

(56) References Cited

U.S. PATENT DOCUMENTS

| | | | |
|---|---|---|---|
| 6,134,662 A | 10/2000 | Levy et al. | |
| 6,775,704 B1 | 8/2004 | Watson et al. | |
| 9,634,837 B1 * | 4/2017 | Knecht | H04L 67/02 |

(Continued)

OTHER PUBLICATIONS

GB Intellectual Property Office, GB1520262.5, Combined search and examination report, dated Apr. 13, 2016.

(Continued)

*Primary Examiner* — Natasha W Cosme
(74) *Attorney, Agent, or Firm* — Leveque IP Law, P.C.

(57) ABSTRACT

Broadly speaking, embodiments of the present technique provide apparatus, systems and methods to enable secure communication between devices. In particular, the present techniques provide an apparatus configured to monitor for a data packet transmitted between a transmitter and a receiver, determine if the data packet is permitted to be transmitted, and act on at least part of the data packet to prevent the receiver from acting on the data packet if it is not permitted to be transmitted. In other words, the present techniques provide/implement security filters in a communication channel between a transmitter and a receiver to reduce the risk that unauthorised data packets are sent to, and implemented by, the receiver device.

19 Claims, 13 Drawing Sheets

(56) References Cited

U.S. PATENT DOCUMENTS

2006/0168273 A1    7/2006   Ofir
2012/0265984 A1   10/2012   Ramanujan
2013/0104231 A1    4/2013   Niner et al.
2015/0191135 A1    7/2015   Noon et al.

OTHER PUBLICATIONS

European Patent Office, PCT/GB2016/053494, PCT ISR and Written Opinion, dated Feb. 6, 2017.

* cited by examiner

70

70

ZERO LATENCY GATEWAY

PRIORITY CLAIM

This application is a 35 U.S.C. 371 National stage U.S. patent application of PCT patent application PCT/GB2016/053494 with an International filing date of Nov. 8, 2016 claiming priority to GB patent application 1520262.5 filed on Nov. 17, 2015, the entire content of which is hereby incorporated by reference.

FIELD OF THE DISCLOSURE

The present techniques generally relate to methods, apparatus and systems for filtering data packets.

BACKGROUND

There are ever increasing numbers of devices within the home, office buildings or the outdoor environment that have processing and communication capabilities which allow such devices to interact with other processing devices and cloud services. Everyday objects and relatively small scale processing devices may be connected to each other and to central platforms as part of the "Internet of Things" (IoT). For example, a heating system in the home may gather information from various temperature sensors and control the activation of heaters based on the gathered information; a factory pollution monitoring sensor may gather information from various chemical sensors and arrange maintenance based on the gathered information; whilst a healthcare provider may use wireless sensors, such as a heart rate monitor to track the health of patients while they are at home. In the cases described above the data is generally forwarded to a cloud service on the internet.

However, such devices tend to have low processing power and small memory capacity. The devices may lack user interfaces because, for example, of the cost of having a user interface such as a display, or because a display consumes too much power, or because of the physical size of the device itself making it difficult to provide a user interface. The devices may need to be configured in order to connect to the IoT or to other devices/services, but may lack, or have reduced capabilities for, configuration directly on the device. The low processing power/small memory capacity of such devices may make them more vulnerable to attack (e.g. being hacked). For example, modern vehicles may contain dozens of such devices, which could potentially be hacked and used to control the vehicle when the driver is not present, or potentially override the actions of a driver who is present in the vehicle.

Accordingly, the present applicant has recognised the need for an improved technique to enable secure communication between devices.

DESCRIPTION OF THE DRAWINGS

The techniques are diagrammatically illustrated, by way of example, in the accompanying drawings, in which.

DETAILED DESCRIPTION

Figure 1:
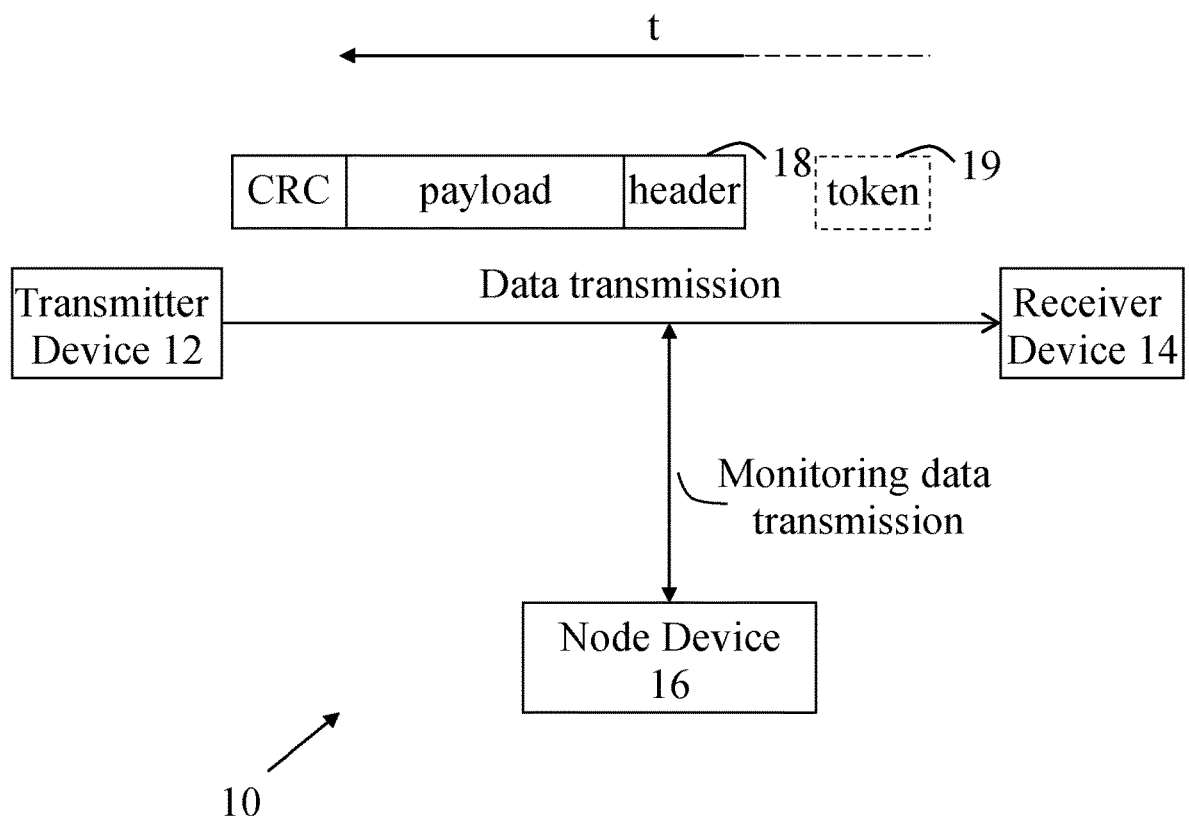
FIG. 1 shows a schematic diagram of a system to filter data packets transmitted between devices.

According to one embodiment of the disclosure there is provided a method of filtering data packets.

According to another embodiment of the disclosure there is provided an apparatus for filtering data packets.

According to yet another embodiment of the present disclosure there is provided a system for filtering data packets.

As will be appreciated by one skilled in the art, the present techniques may be embodied as a system, method or computer program product. Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Broadly speaking, embodiments of the present technique provide apparatus, systems and methods to enable secure communication between devices. In particular, the present techniques provide an apparatus configured to monitor for a data packet transmitted between a transmitter and a receiver, determine if the data packet is permitted to be transmitted, and act on at least part of the data packet to prevent the receiver from acting on the data packet if it is not permitted to be transmitted. In other words, the present techniques provide/implement security filters in a communication channel between a transmitter and a receiver to reduce the risk that unauthorised data packets are sent to, and implemented by, the receiver device.

The term "data packet" is used interchangeably herein with the terms "message", "data", and "packet". The term "apparatus" is used interchangeably herein with the terms "node", "node device", "bus node", "gateway", "router", "repeater", "optical fibre repeater", "network hub", "network router", "medium converter" (e.g. optical to wired, wired to wireless, etc.), and "network switch".

The term "communication channel" is used interchangeably herein with the terms "channel", "communication bus", "bus", "serial bus", "parallel bus", "multilane-serial bus", "PCI express", "gigabit Ethernet". "controller area network (CAN) bus", "Ethernet", "optical fibre(s)", and "wireless communication channel" (e.g. radio, Bluetooth®, WiFi).

FIG. 1 shows a schematic diagram of a system 10 to filter data packets transmitted between a transmitter device 12 and a receiver device 14. The transmitter device 12 and receiver device 14 are configured to communicate via at least one communication channel, such as, for example, a serial bus, a controller area network (CAN) bus, Ethernet, optical fibre, or a wireless communication channel (e.g. radio, Bluetooth®, WiFi). Data packets are transmitted from the transmitter device 12 to the receiver device 14 via the communication channel. The communication channel may be vulnerable to sniffing or hacking, such that a malicious third party may be able to send unauthorised messages (data packets) to the receiver device 14 over the communication channel. The receiver device 14 may then implement or act upon the received unauthorised messages. In a particular embodiment, the receiver device 14 is a low processing power/small memory capacity device, which may mean that the receiver device 14 may not have the resources (power, memory, etc.) to determine for itself if a message is authorised or unauthorised. Thus, the receiver device 14 may simply implement all messages it receives, including unauthorised messages transmitted by a malicious third party.

To improve the security of the communications between the transmitter device and receiver device 14, system 10 comprises a node device 16 which is coupled to, or is located on, the communication channel between the transmitter device and receiver device 14. For example, the node device 16 may be coupled to, or located on, the same electrical connection, optical connection or wireless connection between the transmitter device 12 and receiver device 14. The node device 16 may be physically located between a transmitter device 12 and a receiver device 14, or may simply be located somewhere on a communication channel/path that exists between a transmitter device and a receiver device. One node device 16 may be configured to monitor data packets transmitted between a transmitter device 12 to more than one receiver device 14, and thus, may be coupled to, or located on, each communication path between a transmitter device and one or more receiver devices. The node device 16 is configured to monitor data transmission between the transmitter 12 and the receiver 14, or the data being transmitted to the receiver device 14 (which may or may not have originated from the transmitter device 12). In particular, the node device 16 is configured to listen for a message (data packet) 18 that is sent to the receiver device 14 along the communication channel and determine if the monitored message 18 is authorised (permitted) to be sent to the receiver device 14 before the entire message is received by the receiver device 14. The node device 16 parses the monitored message 18 (i.e. the header and payload portions of the message), before the trailing checksum of the monitored message 18 is received by the receiver device 14 (in a time t that begins from transmission/receipt of the header, as indicated by the solid arrow in FIG. 1). If the node device 16 determines that the monitored message 18 is not permitted to be sent to the receiver device 14, the node device 16 distorts the monitored message 18 such that the receiver device 14 is unable to act upon/implement the distorted message. Thus, in embodiments, unauthorised messages sent by a malicious third party may be distorted by the node device 16 and the distorted message is permitted to continue being transmitted to the receiver device 14. Additionally or alternatively, the monitored data packet 18 may be intercepted and discarded by the node device 16 such that transmission to the receiver device 14 is prevented.

In many (serial) bus systems, a data packet 18 typically comprises a header, a payload and a trailing checksum or trailing cyclic redundancy check (CRC) value. (The serial bus system is merely one example of a bus system where the present techniques may be implemented—the present techniques may also be implemented on parallel bus systems and/or multilane-serial bus systems). The speed of communication along the communication bus enables the node device 16 to listen to and parse the data packet before the data packet has been received in full by the receiver device, and in particular, before the trailing checksum/CRC value is received by the receiver device 14. Thus, in embodiments, determining if the monitored data packet is permitted to be transmitted comprises analysing (parsing) the data packet at the node device 16 before the entire monitored data packet 18 is received by the receiver device 14. The time arrow in FIG. 1 shows how that the time to analyse the data packet is triggered by transmission of the data packet 18 (and in particular embodiments, by the header of the data packet). In embodiments, if the node device 16 determines that the monitored data packet 18 is not permitted to be sent to the receiver device 14, the node device 16 may distort the trailing checksum/CRC value, such that the resulting distorted message is treated as a junk message by the receiver device 14 and is not acted on/implemented. As bus speeds on serial, multilane-serial or parallel bus systems are slow (e.g. 100 kbits/s to a few Mbits/s), a low-cost microcontroller/microprocessor may have enough resources to perform the filtering (parsing) of the monitored data packet 18 before the entire data packet is received by the receiver device 14. In embodiments, distorting at least part of the data packet if the data packet is not permitted to be transmitted comprises modifying at least part of the data packet, modifying to invalidate at least part of the data packet, modifying or overriding at least part of the data packet (e.g. a checksum value), such that the data packet may not be understood, read or implemented by the receiver device 14.

The node device 16 may determine if a monitored data packet 18 is permitted to be transmitted in a number of ways. For example, determining if the data packet is permitted to be transmitted may comprise reading source data in the data packet and determining if the source data indicates that the data packet originated from the transmitter device 12. If the data packet appears to originate from the transmitter device 12, the node device may permit the monitored data packet 18 to be transmitted unaltered. However, as a malicious third party may spoof the transmitter device 12 (particularly on certain types of communication channel, such as Ethernet), merely checking the source data may not be sufficient to filter out unauthorised data packets 18. Thus, in embodiments, determining if the data packet is permitted to be transmitted comprises analysing if the data packet originates from a network segment that is expected to transmit data packets to the receiver device.

In alternative embodiments, determining if the monitored data packet is permitted to be transmitted may additionally or alternatively comprise analysing if the monitored data packet 18 matches a pre-defined data packet that the transmitter device 12 is configured to send, and/or matches a pre-defined data packet that the receiver device 14 is configured to receive. The node device 16 may be configured to access a 'whitelist' of data packets that the transmitter device 12 is permitted to send and the receiver device 14 is permitted to receive. The node device 16 may compare transmitted data packets 18 against the whitelist to determine if the monitored data packets 18 are permitted (authorised). Analysing the monitored data packet 18 may comprise comparing at least a part of the monitored data packet with a pre-defined data packet as a whole, or with pre-defined part(s) of a data packet. For example, whole data packets may be pre-defined (e.g. in the whitelist), or portions may be pre-defined (e.g. pre-defined data fields, headers, bit patterns, config entries etc. within a data packet). If the monitored data packet 18 does not comprise, for example, a header that matches a pre-defined header, then the node device 16 may determine that the monitored data packet 18 is not permitted to be transmitted.

Additionally or alternatively, determining if the monitored data packet is permitted to be transmitted may comprise determining the density of data packets targeting a particular receiver device 14. That is, the node device 16 may be configured to check the number of packets that are typically sent to a particular receiver device 14 along a particular network path/communication path, and determine if the transmitted packet 18 means that more packets than usual are being sent to the receiver device 14. The number of data packets 18 that are sent to a particular receiver device may be pre-defined for each type of receiver device, or may be learned over time by the node device 16 by monitoring how many data packets 18 are sent, on average, in a particular period, to a particular receiver device 14. For example, if the density of data packet transmissions towards a particular receiver device 14 is higher than expected (compared to a learned average, or to a predefined value), then the node device 16 may determine that the data packet 18 is a malicious (unauthorised) data packet. A higher than expected density may indicate brute-force attacks and/or malicious security scans, for example.

In embodiments, the node device 16 may have at least two operational modes: a passive monitoring mode, and an active mode. In the passive monitoring mode, the node device 16 may be configured to monitor for data packets transmitted along the communication bus, and determine if the monitored data packets are permitted (authorised). In the active mode, the node device 16 may be configured to take action if the node device determines that a data packet is not permitted to be sent. For example, in the active mode the node device 16 may distort the unauthorised data packet 18. Thus, in embodiments, the node device 16 may be configured to switch, responsive to the determining and if the data packet 18 is not permitted to be transmitted, from a passive monitoring mode to an active mode, and to distort, while in the active mode, at least part of the data packet 18 if the data packet is not permitted to be transmitted.

In embodiments, the node device 16 (apparatus) for filtering data packets transmitted between a transmitter device and a receiver device, comprises: an interface configured to monitor a data packet transmitted from the transmitter device to the receiver device; and at least one processor configured to: determine if the data packet is permitted to be transmitted between the transmitter device and the receiver device, and distort, responsive to the determining, at least part of the data packet if the data packet is not permitted to be transmitted.

As mentioned earlier, the processor of the node device/apparatus 16 is configured to analyse the data packet before the entire data packet is received by the receiver device 14.

The node device/apparatus 16 may comprise a data store configured to store: pre-defined data on data packets that the transmitter device is configured to send; and pre-defined data on data packets that the receiver device is configured to receive; wherein the processor is configured to determine if the data packet is permitted to be transmitted between the transmitter device and the receiver device by comparing the data packet to the pre-defined data in the data store.

In embodiments, a data packet 18 is either preceded by a data packet comprising a cryptographic token 19 or the cryptographic token 19 is prepended to the data packet 18. Alternatively, the cryptographic token 19 may be transmitted independently of the data packet 18, and prior to transmission of the data packet 18. The cryptographic token 19 may only be understood by the node device 16 and may be ignored or treated like a junk message by the receiver device 14. Thus, the cryptographic token 19 may be used to aid the filtering performed by the node device 16. The cryptographic token 19 may use either of the following as its target address: an unused address that is in the same bus segment as the receiver device 14, or the address of the receiver device 14 together with a function that the receiver device 14 is unable to implement itself. The node device 16 is able to use the cryptographic token 19 to determine if the trailing monitored data packet 18 is authorised, but since, in particular embodiments, the receiver device 14 may not understand the cryptographic token 19, it will ignore the cryptographic token 19 on receipt. (As mentioned earlier, a receiver device 14 may not understand the cryptographic token for a variety of reasons, such as, for example, that it does not have the memory, processing capabilities, and/or power required to process the token.)

Accordingly, in embodiments, the node device 16 is configured to monitor for a cryptographic token 19 transmitted from the transmitter device 12 to the receiver device 14; and monitor, if a cryptographic token 19 is transmitted, for the data packet 18 transmitted from the transmitter device 12 to the receiver device 14. The node device 16 may take different actions depending on whether or not the prepended token 19 is received prior to the data packet 18. For example, if the token 19 is received, the node device 16 may distort at least part of the data packet 18 if the cryptographic token 19 does not correspond to the data packet. Similarly, if no token 19 is received, the node device 16 may distort at least part of the data packet 18. In embodiments, the time arrow in FIG. 1 shows how that the time to analyse the data packet may be triggered by transmission of the token 19 (as shown by the dashed portion of the arrow), or by transmission of the data packet 18 (as shown by the solid portion of the arrow).

In embodiments therefore, the node device/apparatus 16 is further configured to: monitor for a cryptographic token transmitted from the transmitter device to the receiver device; and monitor, if a cryptographic token is transmitted, for the data packet transmitted from the transmitter device to the receiver device. The node processor may be further configured to: distort, responsive to the monitoring, at least part of the monitored data packet if the data packet is not preceded by the cryptographic token.

In embodiments, the node device interface may be configured to monitor data transmissions on a first communication channel and a second communication channel; and the processor is further configured to: monitor, for a cryptographic token transmitted from the transmitter device to the receiver device over a first communication channel; and monitor, for the data packet transmitted from the transmitter device to the receiver device over a second communication channel.

In such embodiments, the processor may be further configured to: distort, responsive to the monitoring, at the node device, at least part of the monitored data packet if the cryptographic token is not received on the first communication channel before transmission of the data packet from the transmitter device to the receiver device is completed.

In embodiments, the node device processor is further configured to: determine, responsive to the monitoring, if the cryptographic token corresponds to the data packet. In particular embodiments, the processor is further configured to: distort, responsive to the determining, at the node device, at least part of the monitored data packet if the cryptographic token does not correspond to the data packet.

As mentioned above, the data packet 18 may comprise a trailing checksum or cyclic redundancy check (CRC) value at the end of the data packet, as illustrated in FIG. 1. Thus, in embodiments, the node device 16 may distort at least part of the data packet 18 by distorting a trailing checksum or cyclic redundancy check (CRC) value in the data packet, if the data packet is not permitted to be transmitted. Distorting the trailing checksum or CRC value may comprise modifying (or overriding) the checksum or CRC value to an invalid value. In embodiments where the checksum or CRC value is at the front of the data packet 18 (i.e. where the data packet 18 comprises a leading checksum or CRC value), the node device 16 may distort content of the monitored data packet 18 to prevent the data packet being implemented by the receiver device 14.

In embodiments, the node device 16 may be retroactively fitted into a system or network.

In embodiments, the node device 16 may be configured to parse the content of a data packet to determine if the content of data packet is indicative of the data packet being a malicious data packet. For example, the node device 16 may look for attack patterns (e.g. longer than necessary code portions) or may look for values within the data packet that are higher than the accepted values for a particular receiver device. In embodiments, the node device 16, the transmitter device 12, and/or the receiver device 14 may be configured to observe data packet transmissions in a communication channel (e.g. along a communication bus), not just a node device 16. Thus, the transmitter device 12 and/or receiver device 14 may be configured to observe bus transmissions and perform data packet filtering, in addition to the default role of transmitting/receiving. This additional observation and filtering functionality may be achieved by using spare CPU cycles.

In embodiments, the present techniques may be used for translating data packets which are sent by legacy transmitter devices to new receiver devices that are configured to use new communication protocols. For example, a node device may be configured to parse data packets that are sent by a legacy transmitter device (using legacy communication protocols), and modify the data packets based on a new communication protocol so that the receiver device can understand and interpret the data packets. The node device may be configured to perform a man-in-the-middle style attack on the data packets so that the data packets can be updated using the new communication protocol. Similarly, the node device may be configured to translate data packets that are sent by new transmitter devices to legacy receiver devices that are only able to use older communication protocols. For example, a node device may be configured to parse data packets that are sent by a transmitter device (using new/current communication protocols), and modify the data packets based on a legacy communication protocol so that the legacy receiver device can understand and interpret the data packets.

In embodiments, the present techniques may enable man-in-the-middle attacks to be performed for the purpose of, for example, debug tools for wireless protocols. For example, a node device may be configured to modify the CRC or checksum value of authorised/permitted data packets, and to rebroadcast the data packets using the attacker's MAC address or other identifier.

FIGS. 2 to 5 show schematic diagram of an example system to filter data packets transmitted between transmitter and receiver devices in various systems. In embodiments of the present techniques, there is provided a system for filtering data packets, the system comprising: a transmitter device and a receiver device arranged in communication via a communication channel; and a node device arranged between the transmitter device and the receiver device and configured to: monitor a data packet transmitted from the transmitter device to the receiver device over the communication channel; determine if the data packet is permitted to be transmitted between the transmitter device and the receiver device; and distort, responsive to the determining, at least part of the data packet if the data packet is not permitted to be transmitted.

Figure 2:
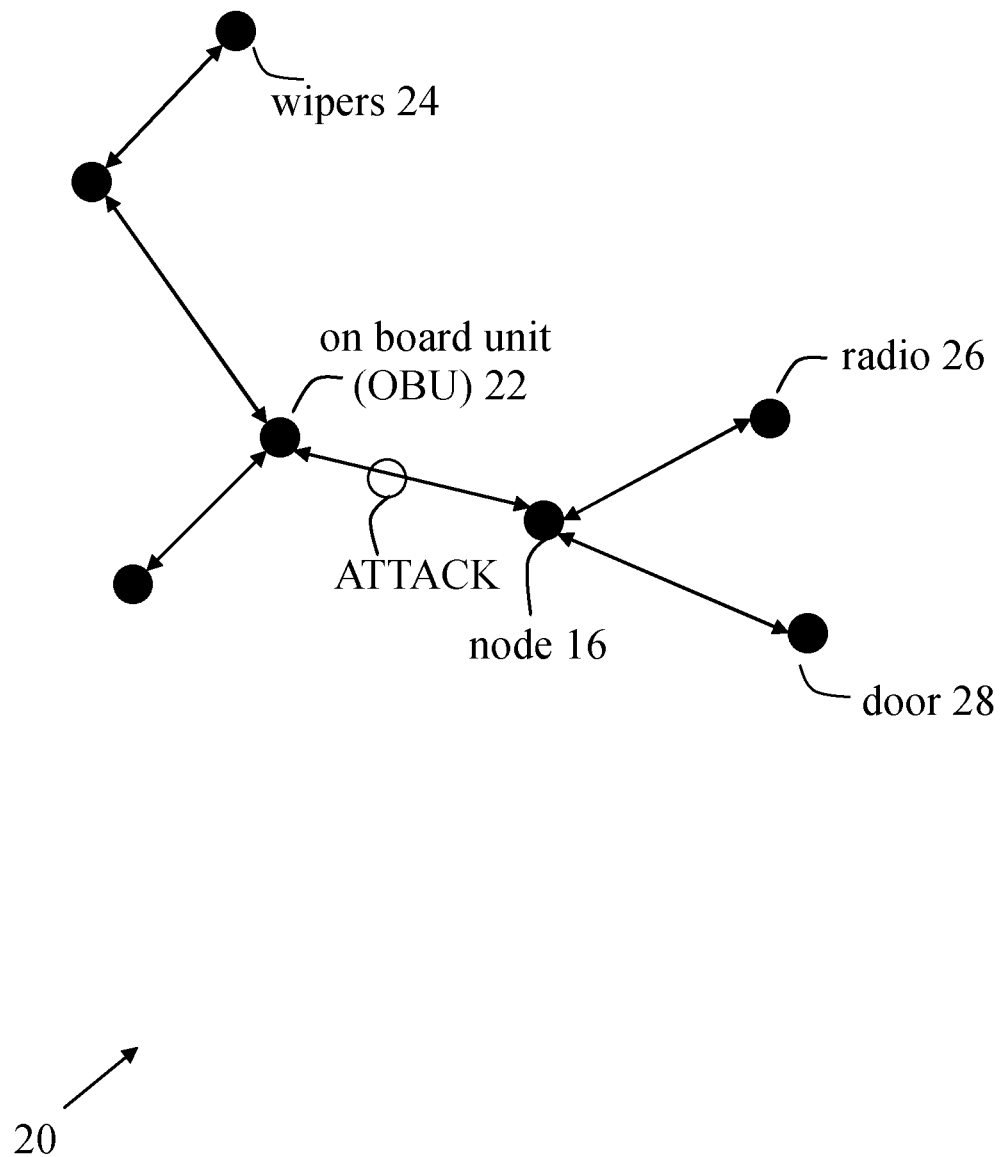
FIG. 2 shows a schematic diagram of an example system to filter data packets transmitted between components in a vehicle.

FIG. 2 shows an example system 20 of multiple transmitter and receiver devices in a vehicle. The black circles represent devices within system 20, each of which could be a transmitter device 12, a receiver device 14, or a node device 16, depending on whether the device is transmitting, or receiving, or located on a path between a transmitter and receiver. The arrows represent the communication paths between particular devices in the system 20. There may be multiple different devices within a typical modern vehicle, such as those which control in-vehicle air conditioning, windscreen wipers 24, steering mechanism, automatic braking system, engine control, radio 26, doors 28, and so on. An on board unit (OBU) 22 may be configured to control the devices within the vehicle and may store the permissions which define what each device can or cannot do, and which devices can control other devices within the system 20. The on board unit 22 (OBU) may be configured to control, for example, the radio 26 and the wipers 24. However, the radio 26 may not have the permissions to control wipers 24.

In an illustrative example, a malicious third party may be able to tap into system 20 at the point denoted "ATTACK" in FIG. 2. The malicious third party may cause a data packet to be transmitted in the system 20, where the data packet may appear to have originated from radio 26. The data packet may have a target address of the wipers 24 and may contain instructions to switch the wipers 24 off (which could be dangerous if the vehicle is driving in wet weather). In this case, the radio 26 may be considered the transmitter device 12 (although the data packet may not explicitly include any source information), and the wipers 24 may be considered the receiver device 14. The on board unit 22 may perform the function of a node device 16 and listen to messages that are transmitted on the communication paths in system 20.

When the on board unit 22 detects the malicious data packet, it checks to see if the radio 26 is permitted to send messages to wipers 24. (If there is no source information in the data packet, and the on board unit 22 merely sees that the data packet appears to have been transmitted from the communication bus segment corresponding to the radio 26, the on board unit 22 checks if a data packet that targets wipers 24 is expected to be transmitted from the direction of radio 26.) If the radio 26 is not permitted to send messages to the wipers 24 (or if data packets that target wipers 24 are not expected from the communication bus segment corresponding to radio 26), the OBU 22 distorts at least a part of the malicious data packet to prevent the wipers 24 from acting on the instructions contained within the packet. Similarly, if the on board unit 22 had been compromised by a malicious third party and was being used to transmit messages to the door 28 (to e.g. unlock the door 28 without the vehicle owner's key), the device(s) located between the OBU 22 and door or door unlocking system 28 may be able to function as a node device 16 and parse messages sent in the system 20 along the communication bus that it is connected to. The node 16 may determine that the OBU 22 is not permitted to send messages to the door 28 to, for example, lock and unlock the door 28, and thus, the node 16 may distort at least part of the malicious data packet as it is being transmitted to the door 28. Thus, in this way, node devices in a vehicle may be able to prevent malicious messages being implemented by receiver devices in the system 20.

In embodiments, as mentioned above, a data packet may not include source information. Thus, the node device may be configured to check whether a data packet that targets a particular receiver device is expected along a particular communication path/bus in the network, or from a particular direction in the network. In CAN-buses, Ethernet networks and other networks, data packets do not typically include a source address, or the source address may be easily spoofed, such that checking the source address alone may not be sufficient to determine if a data packet is malicious. Thus, in embodiments, the node device may determine if a data packet that is being transmitted towards a particular receiver device is permitted/expected along the node's communication path in the network.

Each node device in a system may be configured to check each data packet that is transmitted along the communication bus to which it is coupled. In some cases, a node device may not know if the data packet is permitted to be transmitted (because, for example, it may not have access to the data defining what the transmitter or receiver device are configured to do). Thus, a data packet may be permitted to be transmitted by the node device until it reaches a node device near to the target receiver device which can determine if the receiver device, for example, is permitted to receive the message. In embodiments where a cryptographic token is transmitted before or prepended to a data packet, each node device may be configured to check the cryptographic token. Additionally or alternatively, only the node device located immediately before the receiver device 14 may be configured to check whether the message is permitted based on the cryptographic token. This final node device 16 may be configured to prevent transmission of the cryptographic token to the receiver device 14, whether or not the data packet is permitted to be transmitted. Additionally or alternatively, the node device 16 may be configured to allow the cryptographic token to be transmitted to the receiver device 14, since, as explained above, the cryptographic token cannot be interpreted or implemented by the receiver device.

In embodiments, the node devices 16 in a system (such as system 20) may be reconfigurable/updatable. As mentioned earlier, a node device 16 may have access to a whitelist of data packet types that the or each transmitter device 12 in a system is permitted to send, or a whitelist of the receiver devices the or each transmitter device 12 is permitted to communicate with. Similarly, a node device 16 may have access to a whitelist of data packet types that the or each receiver device 14 is permitted to receive, or a whitelist of the transmitter devices the or each receiver device is permitted to receive data packets from. The node device 16 may compare a transmitted data packet with the whitelist(s) to determine if the data packet is permitted. However, the whitelist(s) may change over time, as the devices within a system may be reprogrammed to have new functions, or as new devices are added to a system. Accordingly, the node device 16 is preferably reconfigurable such that it can be provided with updated whitelists or updated security filters. Similarly, as new attack types are identified, the node device 16 may be updatable to recognise the new attack types. In embodiments, the node device 16 is configured to receive data defining one or more data packets that the receiver device is configured to receive. Additionally or alternatively, the node device 16 is configured to receive data defining one or more data packets that the transmitter device is configured to send.

Figure 3:
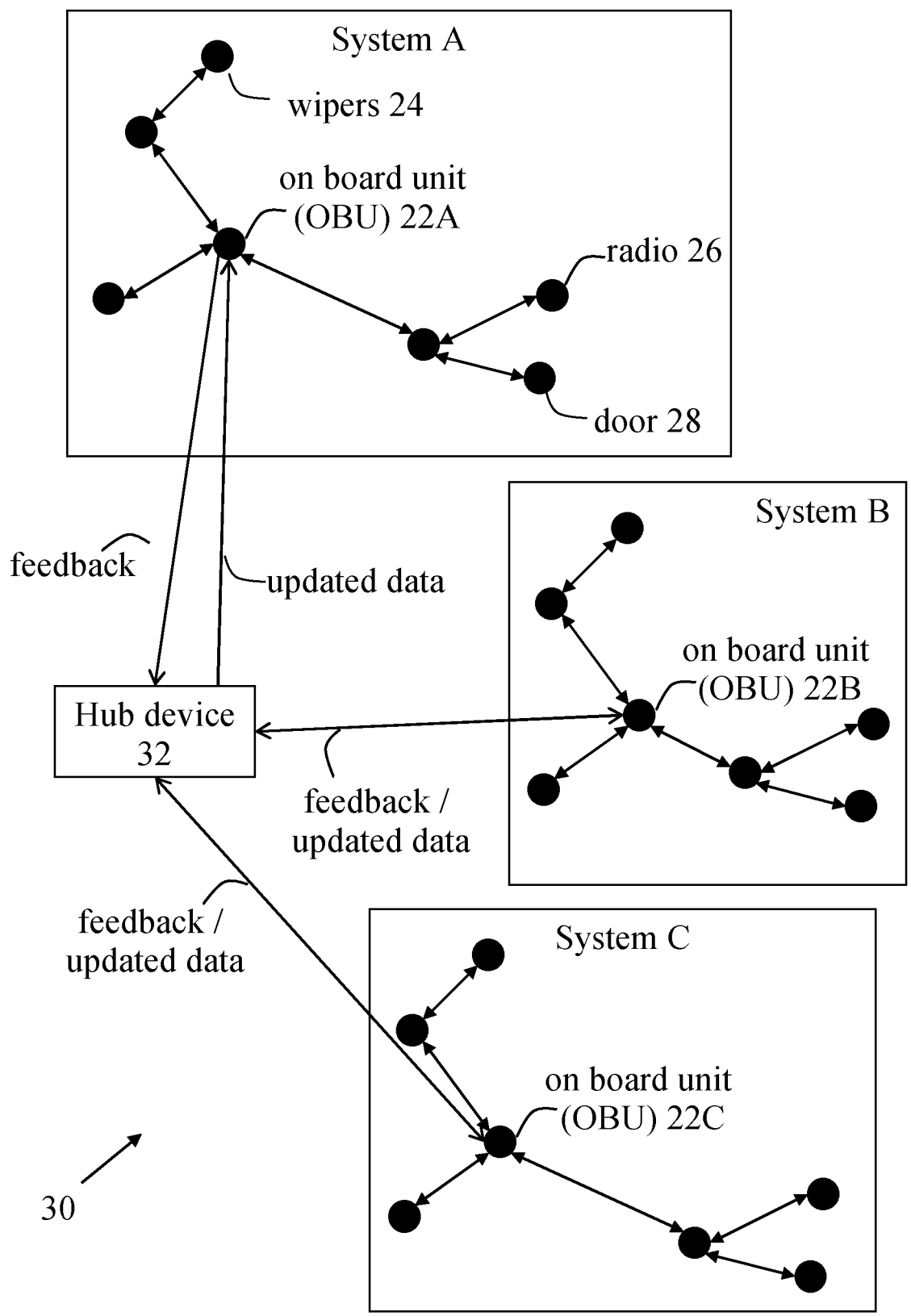
FIG. 3 shows a schematic diagram of an example system to filter data packets, the system having a hub device.

In embodiments, it may be useful to update multiple node devices 16 with new whitelists or security filters substantially simultaneously. For example, a vehicle manufacturer may wish for all of its vehicles (or a subset thereof) to be updated with new whitelists/filters at the same time, particularly if a new attack has been identified which makes their vehicle vulnerable to malicious attacks. Accordingly, in embodiments, the node device(s) 16 in a plurality of systems, or each of a plurality of node devices 16 in a single system, may receive from a hub device 32 configured to transmit the updated data to a plurality of node devices. FIG. 3 shows a schematic diagram of an example system 30 having a hub device 32. Here, a hub device 32 may be controlled by a vehicle manufacturer and used to receive data from node devices in multiple vehicles (e.g. System A, System B and System C). The node devices may be configured to report to the hub device 32 each message it has distorted. The node devices may be updatable/reconfigurable by the hub device 32, which may use the feedback data to provide updated data to the node devices. The node devices may communicate with the hub device 32 via the internet, a mobile signal, a wireless signal, or otherwise.

Figure 4:
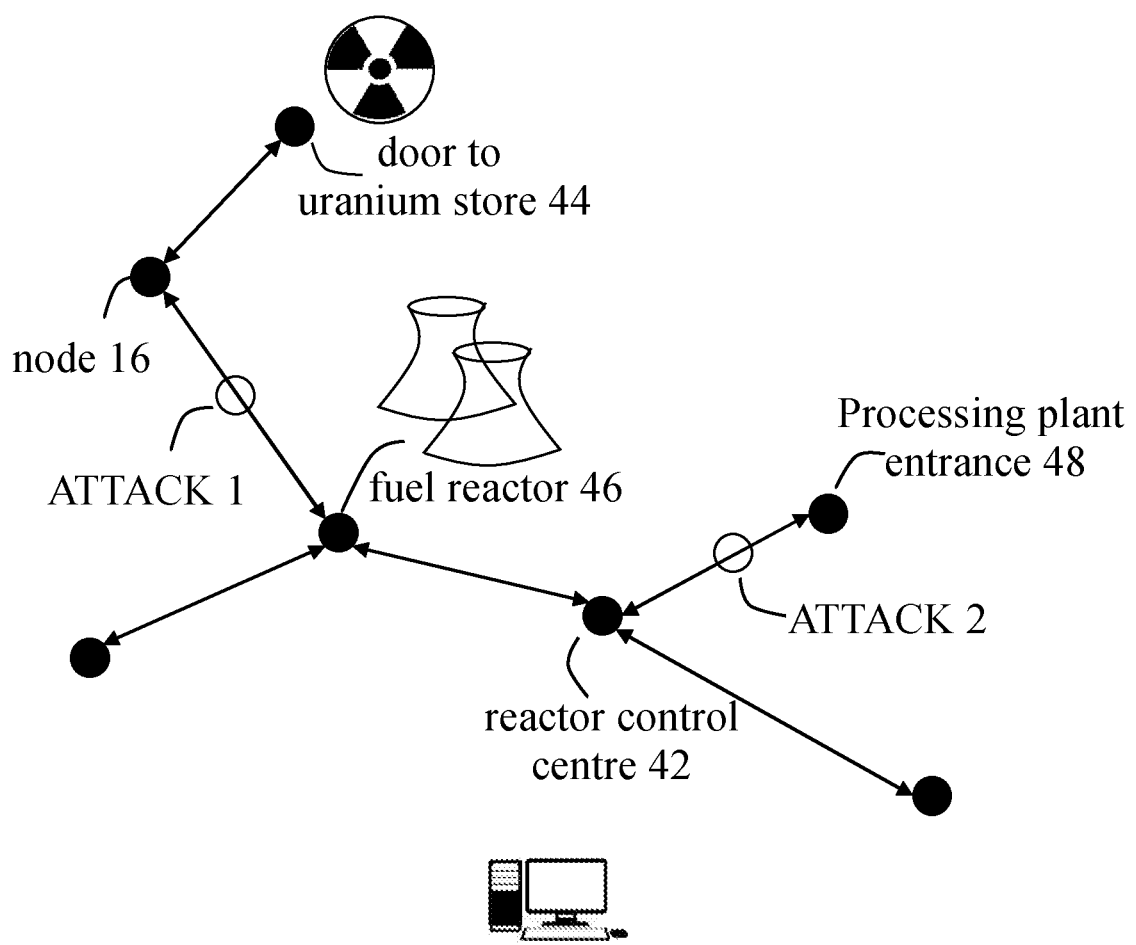
FIG. 4 shows a schematic diagram of an example system to filter data packets transmitted in a nuclear power station.

FIG. 4 shows a schematic diagram of an example system 40 to filter data packets transmitted in a nuclear power station, and illustrates how the present techniques may be applied to buildings and infrastructure. As before, the black circles represent example devices within the nuclear power station system 40, each of which could be a transmitter device 12, a receiver device 14, or a node device 16, depending on whether the device is transmitting, or receiving, or located on a path between a transmitter and receiver. The arrows represent the communication paths between particular devices in the system 40. The devices in system 40 may be, for example, the devices/computers in a reactor control centre 42, the devices/computers which control the door to a uranium fuel store 44, the devices/computers which are within the fuel reactor 46 and the devices/computers which control the power station entrance doors 48. The reactor control centre 42 may be configured to, for example, control who has access to the uranium store door 44, and may control the equipment within the fuel reactor 46.

Examples which illustrate how the present techniques may reduce the risk of malicious attacks in such a power station are now described. In the power station system 40, a malicious third party may be able to tap into the system at the points denoted "ATTACK 1" and "ATTACK 2" in FIG. 4. In this example, for enhanced security, each node device may be configured to listen for cryptographic tokens that are prepended to (or sent before) a data packet, as well as to listen for data packets.

In ATTACK 1, the malicious third party may cause a data packet to be transmitted in the system 40, where the data packet may appear to have originated from a device in reactor control centre 42. The data packet may have a target address of the uranium store doors 44 and may contain instructions to open the doors 44 and bypass other security measures used to open/close the doors 44. In this case, the reactor control centre 42 may be considered the transmitter device 12, and the door 44 may be considered the receiver device 14. The node 16 may listen to and parse messages that are transmitted on its communication paths in system 40. When the node 16 detects the malicious data packet, it checks to see if the reactor control centre 42 is permitted to send messages to the door 44, and if a cryptographic token was transmitted prior to, or is prepended to, the malicious data packet. In this case, the reactor control centre 42 is permitted to send messages to the door 44. However, if no corresponding cryptographic token exists, the node device 16 may be configured to distort the message so that the door 44 ignores the distorted malicious message.

Similarly, in ATTACK 2, a malicious third party transmits a message to that appears to originate from entrance 48 and is targeted at the fuel reactor 46. The reactor control centre 42 may be able to function as a node device and parse messages sent in the system 40 along the communication bus that it is connected to. The node (reactor control centre 42) may determine that the entrance device 48 is not permitted to send messages to the fuel reactor 46. The reactor control centre 42 may also be configured to determine if a message is a malicious message by inspecting the content of the message. For example, if the message instructs a centrifuge to spin at 3000 rpm, but the centrifuge has a maximum setting of 2000 rpm, the reactor control centre 42 may distort a part of the message. Thus, node devices may determine if a message is permitted to be sent by determining the permissions of the transmitter device, the receiver device and/or inspecting the content of the message itself.

Figure 5:
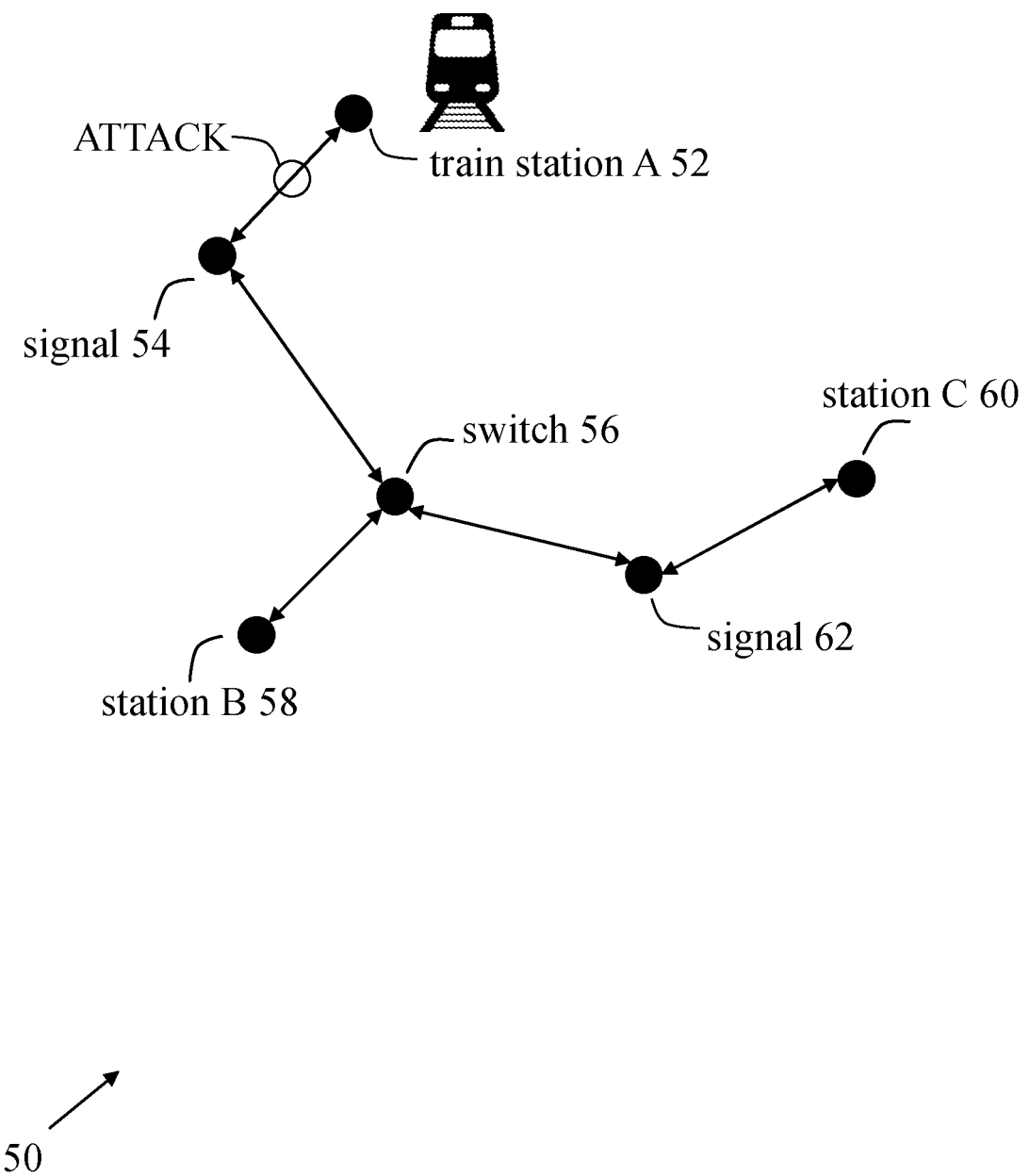
FIG. 5 shows a schematic diagram of an example system to filter data packets transmitted in a rail network.

FIG. 5 shows a schematic diagram of an example system 50 to filter data packets transmitted in a rail or other transport network. The black circles represent devices within system 50, each of which could be a transmitter device 12, a receiver device 14, or a node device 16, depending on whether the device is transmitting, or receiving, or located on a path between a transmitter and receiver. The arrows represent the communication paths between particular devices in the system 50. There may be multiple different devices within a typical rail network 50, such as those which control signals at each train station (e.g. devices at station A 52, station B 58, and station C 60), traffic signals 54 and 62 between stations, and switch 56 which, for example, switches a train from one track to another.

In an illustrative example, a malicious third party may be able to tap into system 50 at the point denoted "ATTACK" in FIG. 5. The malicious third party may cause a data packet to be transmitted in the system 50, where the data packet may appear to have originated from a control device 52 at station A. The data packet may have a target address of the switch 56 and may contain instructions to switch a train travelling between station A to station C to instead travel to station B. This could be dangerous if a second train is travelling on the track from station B to switch 56. In this case, the control device 52 at station A may be considered the transmitter device 12, and the switch 56 may be considered the receiver device 14. The traffic signal 54 may perform the function of a node device 16 and listen to messages that are transmitted on the communication paths in system 50. When the traffic signal 54 detects the malicious data packet, it checks to see if the control device 52 at station A is permitted to send messages to switch 56. If the control device 52 is not permitted to send messages to the switch 56, the traffic signal node 54 distorts at least a part of the malicious data packet to prevent the switch 56 from acting on the instructions contained within the packet.

In each of the example systems of FIGS. 2 to 5, the node device is configured to analyse the data packet before the entire data packet is received by the receiver device.

The system may comprise a data store configured to store: pre-defined data on data packets that the transmitter device is configured to send; and pre-defined data on data packets that the receiver device is configured to receive; wherein the node device is configured to determine if the data packet is permitted to be transmitted between the transmitter device and the receiver device by comparing the data packet to the pre-defined data in the data store.

In the system, the node device may be further configured to: monitor for a cryptographic token transmitted from the transmitter device to the receiver device; and monitor, if a cryptographic token is transmitted, for the data packet transmitted from the transmitter device to the receiver device. The node device may be further configured to: distort, responsive to the monitoring, at least part of the data packet if the data packet is not preceded by the cryptographic token.

In embodiments, the communication channel(s) of the system may be a serial communication bus, such as an Ethernet or a Controller Area Network (CAN) bus, an optical fibre bus, a wireless communication channel, a parallel communication bus, or a multilane-serial bus. The or each node device 16 in the system may be any one of: a gateway, a bus repeater, an optical fibre repeater, a network hub, a network router, or a network switch.

Figure 6:
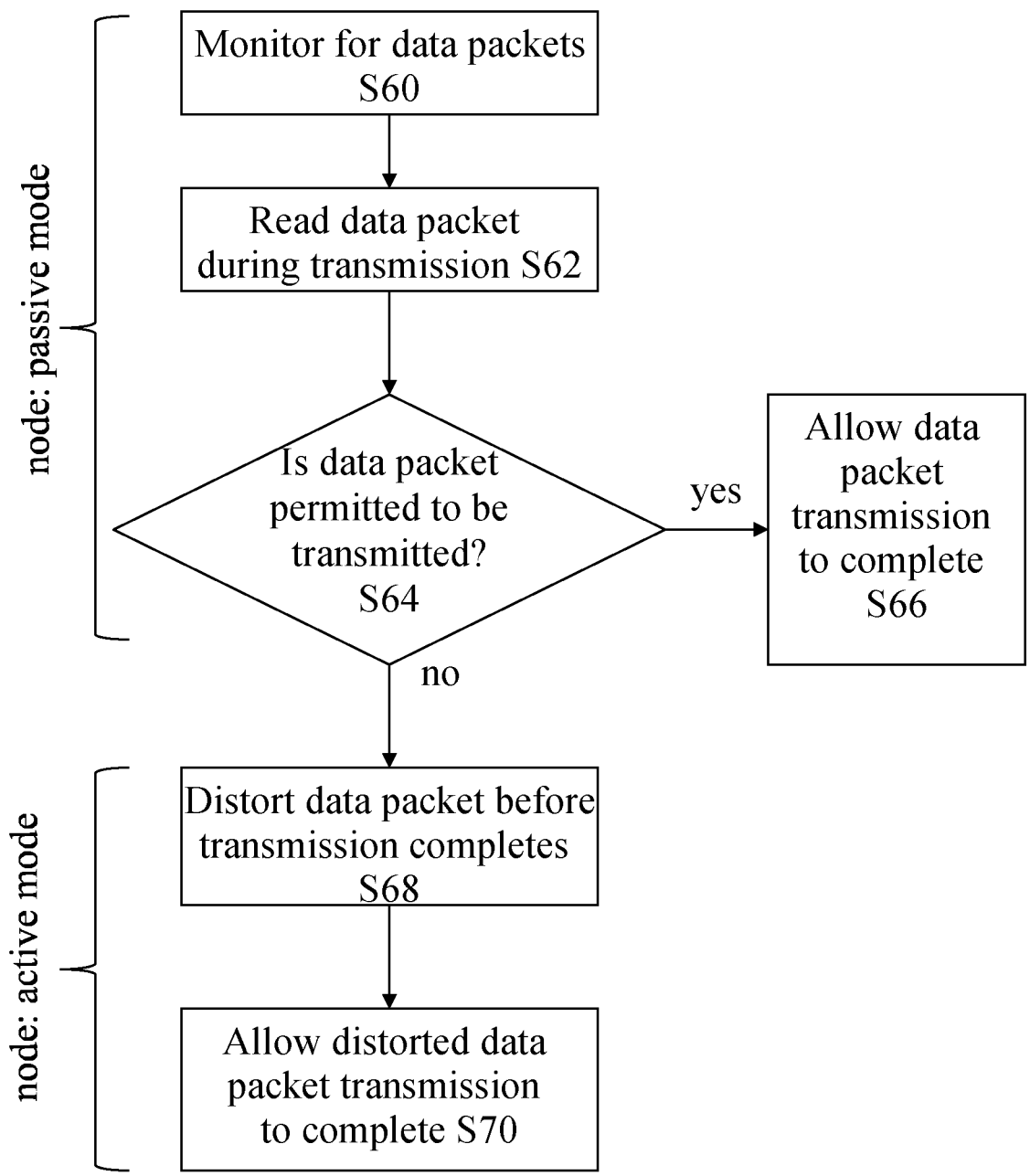
FIG. 6 shows a flow diagram to filter data packets using a node device.

Turning now to FIG. 6, this shows a flow diagram to filter data packets transmitted between a transmitter device and a receiver device, using a node device. A node device that is located between a transmitter device and a receiver device (as illustrated in FIGS. 1 to 5, for example) monitors for data packets transmitted from the transmitter device to the receiver device (step S60). When the node device detects a data packet, it reads/parses the data packet as it is being transmitted to the receiver device, i.e. during transmission to the receiver device (step S62). Thus, the node device acts in real time on the data packet, and must be capable of parsing and analysing the data packet before the entire data packet is transmitted to the receiver device. The node device determines if the data packet is permitted to be transmitted between the transmitter device and the receiver device (step S64). For example, as explained above, the node device may determine if the transmitter device is permitted to send messages, or messages of a particular type, to the receiver device, and/or determine if the receiver device is permitted to receive messages, or messages of a particular type, from the transmitter device, and/or if any instructions contained in the message are permitted to be implemented by the receiver device. If the node device determines that the data packet is permitted to be transmitted, it allows the data packet transmission to complete (step S66).

However, if the node device determines that the data packet is not permitted to be transmitted, the node device distorts at least a part of the data packet before transmission of the data packet completes (step S68). The node device may be configured to switch from a passive listening mode to an active mode in response to the outcome of step S64. In embodiments, the node device may distort (modify) a trailing checksum or CRC value to an invalid value. The node device may then allow the distorted data packet transmission to complete (step S70). The receiver device will not implement or act upon the distorted data packet due to the invalid checksum/CRC value.

Figure 7:
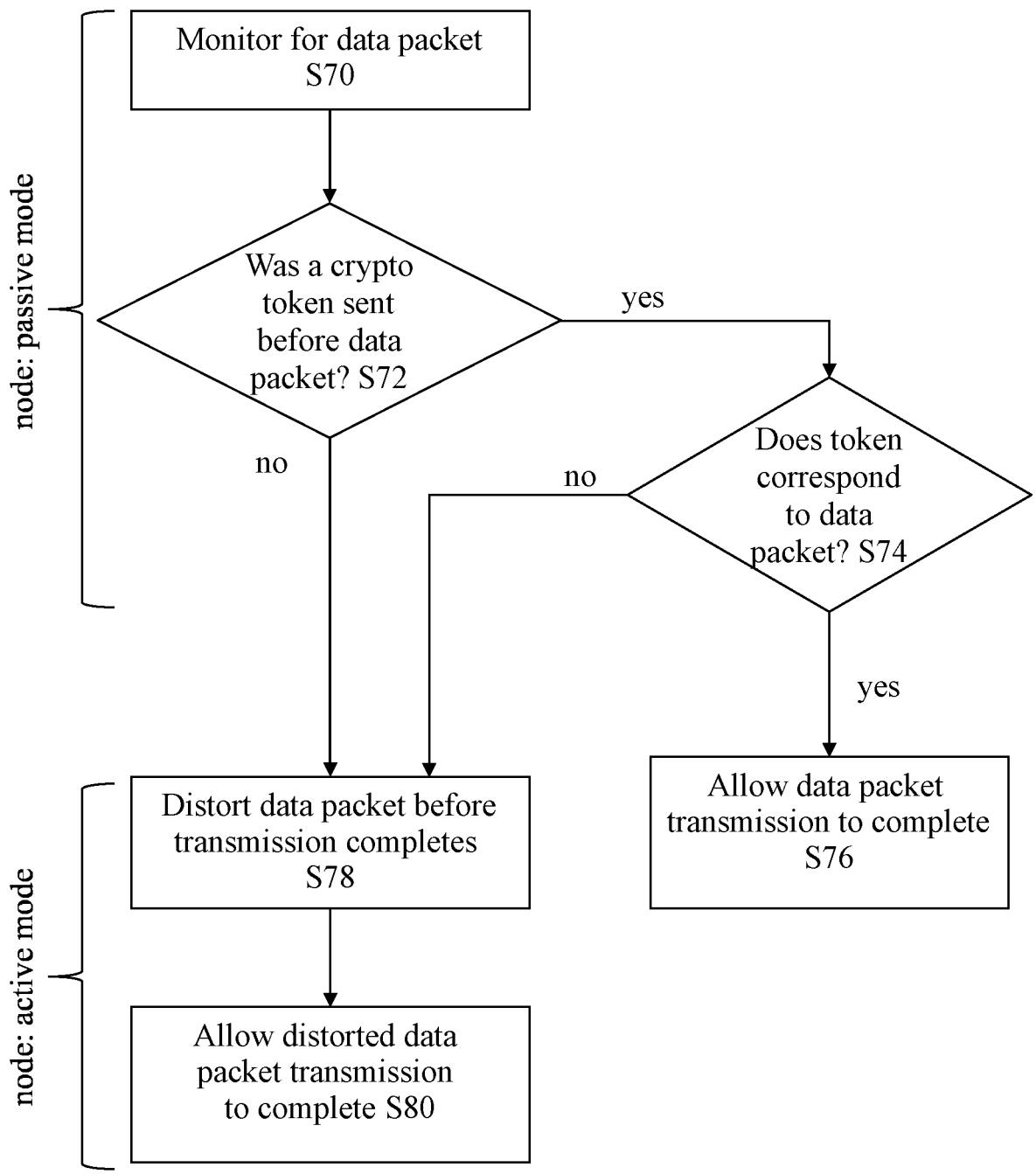
FIG. 7 shows a flow diagram to filter and discard data packets using a node device.

FIG. 7 shows a flow diagram to filter and discard data packets using a node device. A node device that is located between a transmitter device and a receiver device (as illustrated in FIGS. 1 to 5, for example) monitors for data packets transmitted from the transmitter device to the receiver device (step S70). If the node device detects a data packet, the node device is further configured to determine if a cryptographic token was sent before, or prepended to, the detected data packet (step S72). If a cryptographic token was sent before, or prepended to, the detected data packet, the node device determines if the cryptographic token corresponds to the data packet (step S74). In embodiments, the cryptographic token is a simple token which is easy and quick for the node device to determine as corresponding to the data packet (such that the node device can complete the determination before the data packet is entirely transmitted to the receiver device). For example, the cryptographic token may be based on the time that the data packet is transmitted, or a count, or on a cryptographic nonce. If the cryptographic token corresponds to the data packet, the node device may be configured to allow the data packet transmission to complete unaltered (step S76).

If the cryptographic token does not correspond to the data packet (at step S74), or if no cryptographic token is prepended to the data packet (at step 72), the node device may switch into an active participant mode. The node device may distort the data packet before transmission of the data packet completes (step S78). In embodiments, the node device may distort a trailing checksum or CRC value to an invalid value. The node device may then allow the distorted data packet transmission to complete (step S80). The receiver device will not implement or act upon the distorted data packet due to the invalid checksum/CRC value.

Thus, in embodiments, the method of filtering data packets transmitted between a transmitter device and a receiver device comprises: monitoring, at a node device arranged between the transmitter device and the receiver device, a data packet transmitted from the transmitter device to the receiver device; determining, at a node device, if the data packet is permitted to be transmitted between the transmitter device and the receiver device by checking if a cryptographic token was transmitted from the transmitter device to the receiver device before the data packet was transmitted; and distorting, responsive to the monitoring, at the node device, at least part of the data packet if the data packet is not preceded by the cryptographic token and is not permitted to be transmitted.

Figure 8A:
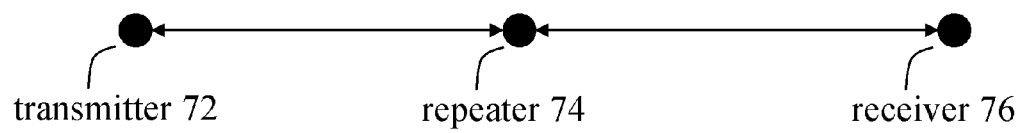
FIGS. 8a and 8b respectively show schematics of data packet transmission between devices via an optical fibre, and of an example system to filter data packets.
Figure 8B:
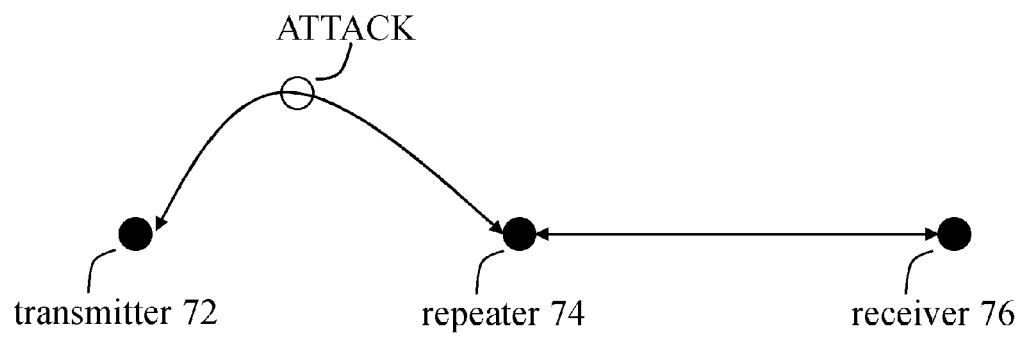

FIGS. 8a and 8b respectively show schematics of data packet transmission between devices via an optical fibre, and of an example system to filter data packets. FIG. 8a shows a typical optical fibre system 70 used to transmit data from transmitter 72 to receiver 76 via a repeater 74. Here, the arrows between the transmitter and repeater, and repeater and receiver represent optical fibres used for communication between the devices. FIG. 8b shows how the typical optical fibre system 70 may be used by a malicious third party to intercept or send messages in the system 70. A malicious third party may bend the optical fibre to perform optical fibre sniffing, and to send malicious data packets to the receiver device 76. The repeater 76 may function as a node device to listen for and parse data packets transmitted between the transmitter 72 and receiver 76 to determine if the data packets are permitted. In this way, the repeater 74 may be able to identify data packets that are transmitted by a malicious third party. The repeater 74 may distort at least a portion of a malicious data packet to prevent receiver device 76 from acting on the data packet, or may block the data packet from being forwarded on to the receiver device 76.

Figure 9A:
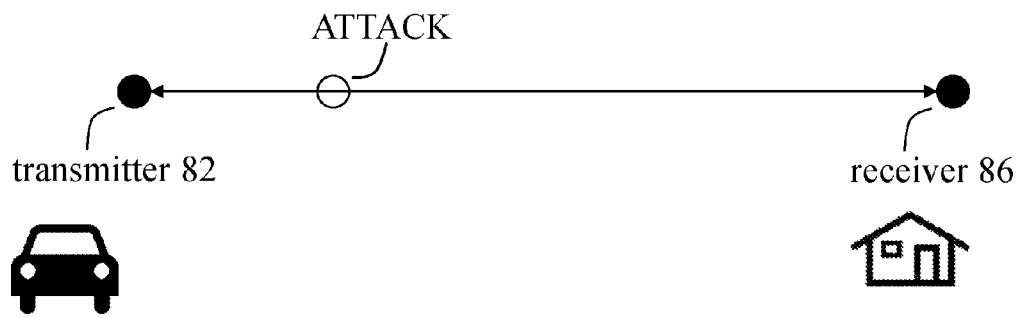
FIGS. 9a and 9b respectively show schematics of how malicious data packets may be transmitted during a wireless transmission, and of an example system to filter data packets.
Figure 9B:
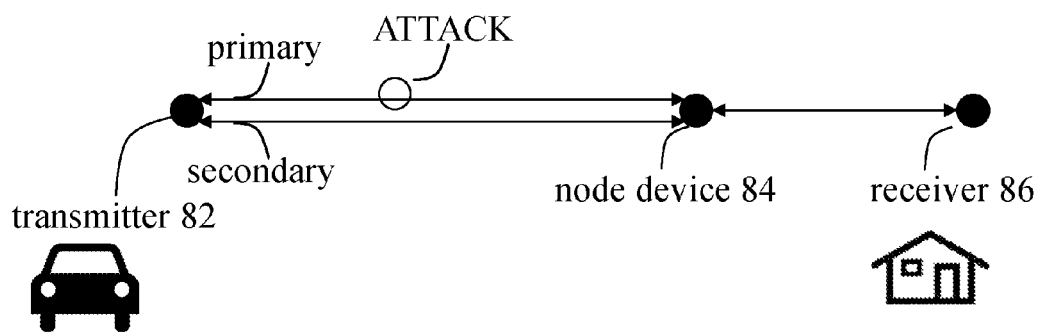

FIGS. 9a and 9b respectively show schematics of how malicious data packets may be transmitted during a wireless transmission, and of an example system to filter data packets. FIG. 9a shows an example system 80 in which data packets are sent from a transmitter to a receiver via a wireless communication channel. In this example, a transmitter device 82 located in a vehicle is used to send messages to a receiver device 86 coupled to a garage door, where the messages instruct the receiver device 86 to open/close the garage door. A malicious third party may be able to listen to and intercept data packets sent from transmitter 82 to receiver 86, such that the third party may be able to operate the receiver device 86 without needing the transmitter device. To overcome this problem, a node device 84 may be provided between the transmitter device 82 and receiver device 86, as shown in FIG. 9b. Here, the node device 84 may be configured to listen to and parse data packets sent between transmitter 82 and receiver 86 to determine if the data packets are permitted to be transmitted. In one embodiment, the transmitter 82 may be configured to send a data packet via a primary channel and send a corresponding cryptographic token on a secondary channel.

A malicious third party may use the primary channel to send a data packet to the receiver device 86. If the node device 84 does not receive a corresponding cryptographic token on the secondary channel, the node device 84 may be configured to distort the data packet before transmission of the data packet is completed. The receiver 86 then receives a data packet which it is unable to interpret or unable to implement. In embodiments, the primary and secondary channels may operate at different frequencies. For example, the primary channel may operate a slower frequency than the secondary channel, such that the cryptographic packet may be sent before, after or at the same time as sending the data packet. The node device 84 may be configured to prevent transmission of the cryptographic token to the receiver 86, when the data packet is permitted or is not permitted to be transmitted. Additionally or alternatively, the node device 84 may be configured to allow the cryptographic token to be transmitted to the receiver device 86, since, as explained above, the cryptographic token cannot be interpreted or implemented by the receiver device.

Figure 10:
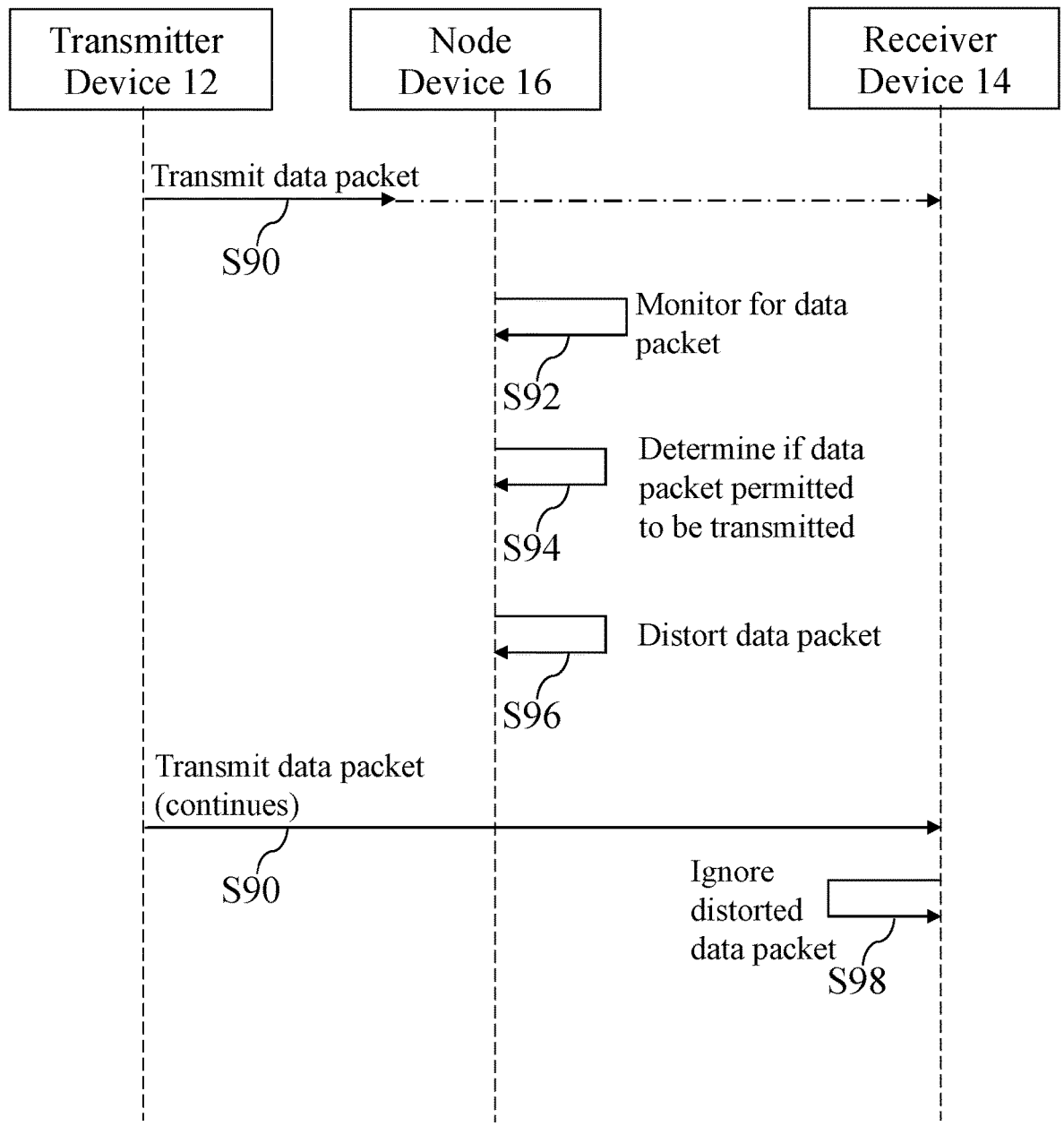
FIG. 10 shows a schematic flow diagram to filter and distort data packets using a node device.

FIG. 10 shows a schematic flow diagram to filter and distort data packets using a node device. A transmitter device 12 transmits a data packet to a receiver device 14 (step S90). A node device 16 is located between the transmitter device 12 and the receiver device 14, and monitors for data packets transmitted from the transmitter device to the receiver device (step S92). As shown in FIG. 10 by the dashed line from the transmitter device 12 to the receiver device 14, the node device 16 listens and parses the data packet before transmission of the data packet is complete (i.e. before the entire data packet is received at the receiver device 14). When the node device 16 detects a data packet, it reads/parses the data packet as it is being transmitted to the receiver device 14 and determines if the data packet is permitted to be transmitted between the transmitter device and the receiver device (step S94). For example, as explained above, the node device may determine if the transmitter device is permitted to send messages, or messages of a particular type, to the receiver device, and/or determine if the receiver device is permitted to receive messages, or messages of a particular type, from the transmitter device, and/or if any instructions contained in the message are permitted to be implemented by the receiver device.

If the node device 16 determines that the data packet is permitted to be transmitted, it allows the data packet transmission to complete. If the node device 16 determines that the data packet is not permitted to be transmitted, the node device distorts at least a part of the data packet before transmission of the data packet completes (step S96). The node device may be configured to switch from a passive listening mode to an active mode in response to the outcome of the determining step. In embodiments, the node device 16 may distort (modify/override) a trailing checksum or CRC value to an invalid value. The node device may then allow the distorted data packet transmission to complete (step S90). The receiver device 14 will not implement or act upon the distorted data packet due to the invalid checksum/CRC value (step S98).

Figure 11:
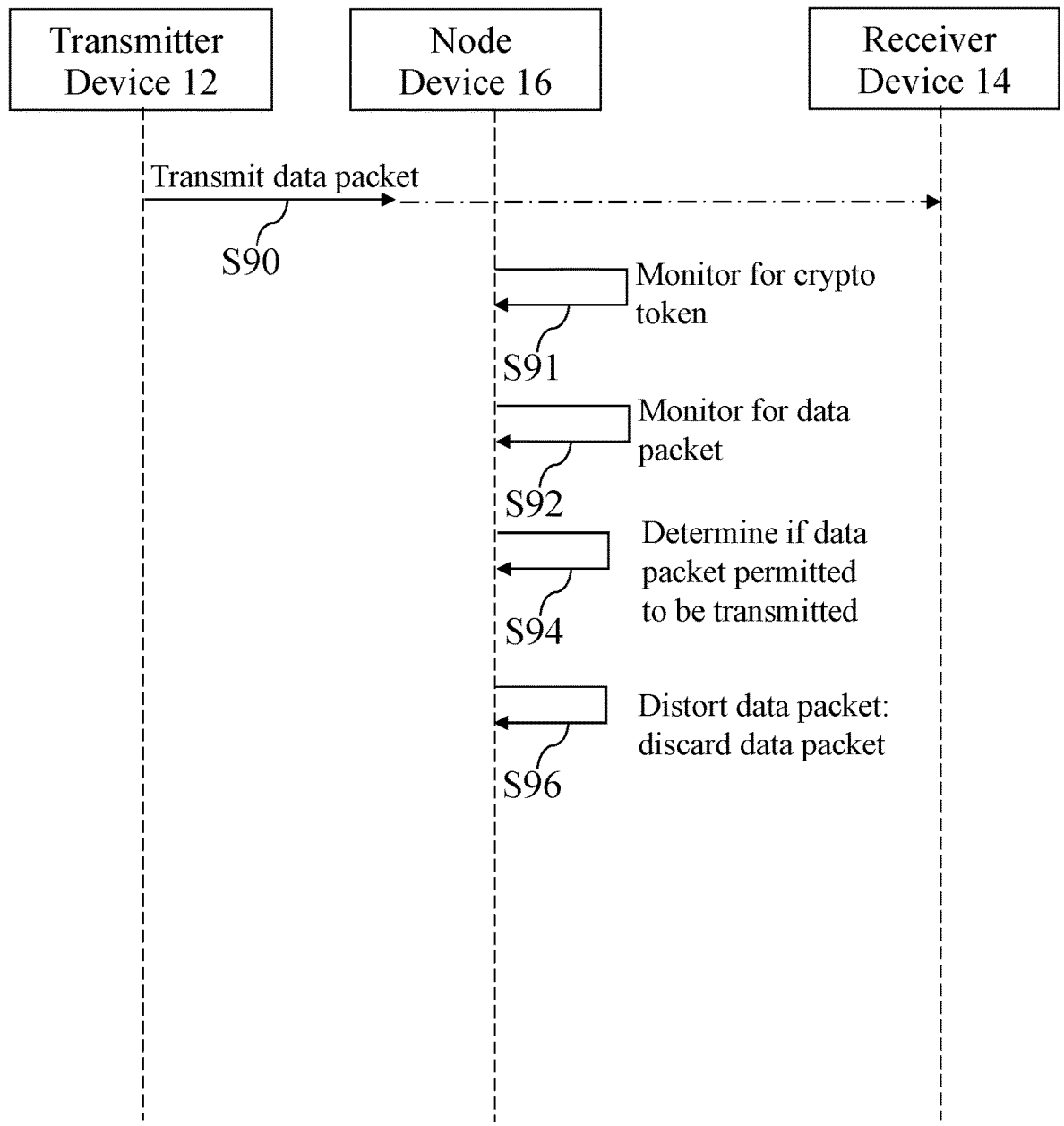
FIG. 11 shows a schematic flow diagram to filter and discard data packets using a node device.

FIG. 11 shows a schematic flow diagram to filter and discard data packets using a node device. A transmitter device 12 transmits a data packet to a receiver device 14 (step S90). A node device 16 is located between the transmitter device 12 and the receiver device 14, and monitors for data packets transmitted from the transmitter device to the receiver device (step S92). As shown in FIG. 11 by the dashed line from the transmitter device 12 to the receiver device 14, the node device 16 listens and parses the data packet before transmission of the data packet is complete (i.e. before the entire data packet is received at the receiver device 14). The node device 16 is configured to monitor for a cryptographic token (step S91) which is transmitted before the data packet, or is prepended to the data packet. If a cryptographic token was sent before, or prepended to, the detected data packet, the node device determines if the cryptographic token corresponds to the data packet (step S94). In embodiments, the cryptographic token is a simple token which is easy and quick for the node device to determine as corresponding to the data packet (such that the node device can complete the determination before the data packet is entirely transmitted to the receiver device). For example, the cryptographic token may be based on the time that the data packet is transmitted, or a count, or on a cryptographic nonce. If the cryptographic token corresponds to the data packet, the node device may be configured to allow the data packet transmission to complete unaltered.

If the cryptographic token does not correspond to the data packet, or if no cryptographic token is prepended to the data packet, the node device 16 may switch into an active participant mode. The node device 16 may distort the data packet before transmission of the data packet completes. In embodiments, the node device may distort a trailing checksum or CRC value to an invalid value. The node device may then allow the distorted data packet transmission to complete. The receiver device will not implement or act upon the distorted data packet due to the invalid checksum/CRC value. Additionally or alternatively, the node device 16 may be configured to distort the data packet by discarding the data packet (step S96) such that it is prevented from reaching the receiver device 14.

Figure 12:
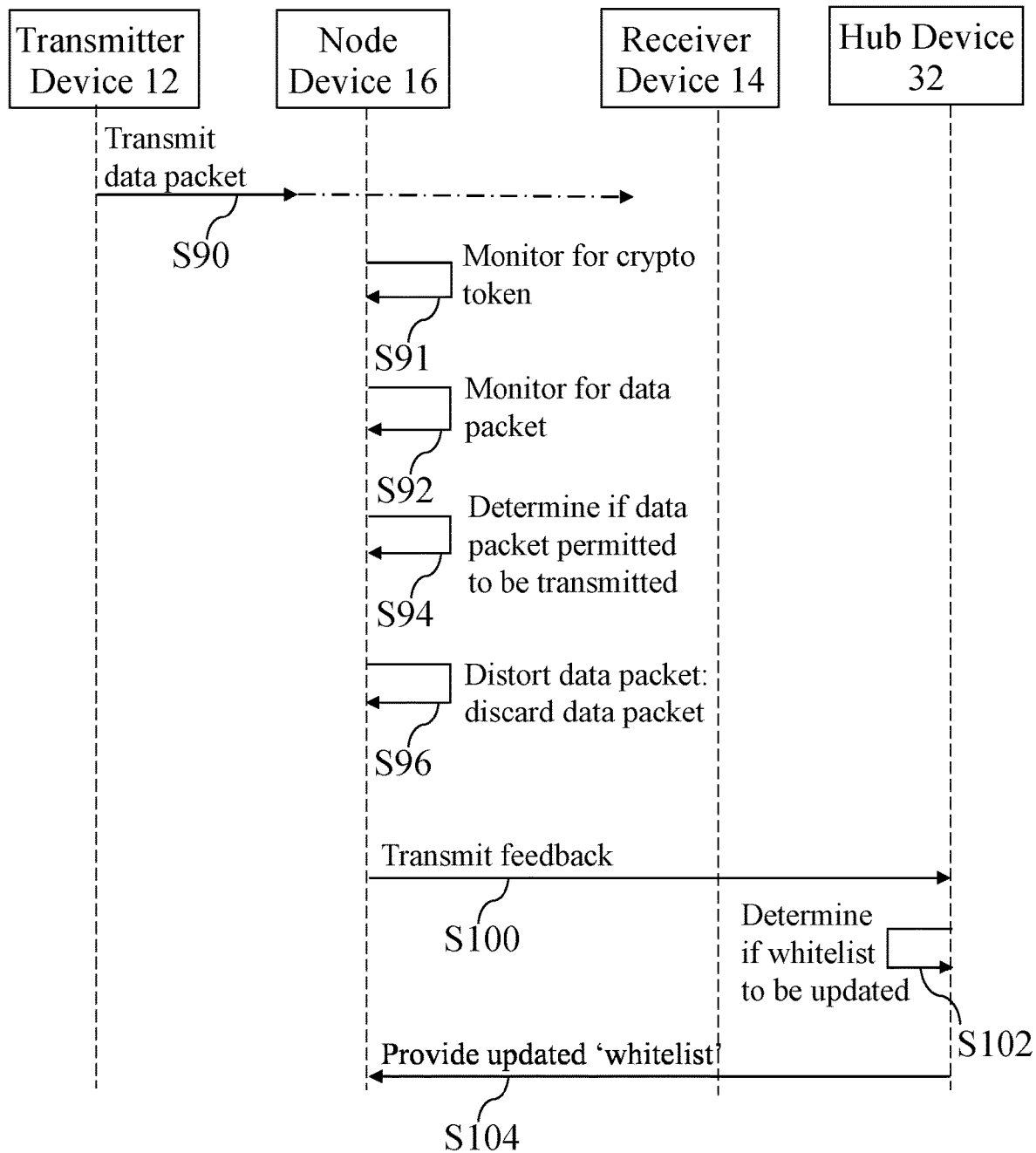
FIG. 12 shows a schematic flow diagram to update a whitelist used to filter data packets.

FIG. 12 shows a schematic flow diagram to update a whitelist used to filter data packets. In embodiments, the node device(s) 16 in a system may be reconfigurable/updatable. As mentioned earlier, a node device 16 may have access to a whitelist of data packet types that the or each transmitter device 12 in a system is permitted to send, or a whitelist of the receiver devices the or each transmitter device 12 is permitted to communicate with. Similarly, a node device 16 may have access to a whitelist of data packet types that the or each receiver device 14 is permitted to receive, or a whitelist of the transmitter devices the or each receiver device is permitted to receive data packets from. The node device 16 may compare a transmitted data packet with the whitelist(s) to determine if the data packet is permitted. However, the whitelist(s) may change over time, as the devices within a system may be reprogrammed to have new functions, or as new devices are added to a system. Accordingly, the node device 16 is preferably reconfigurable such that it can be provided with updated whitelists or updated security filters.

In embodiments, it may be useful to update multiple node devices 16 with new whitelists or security filters substantially simultaneously. Accordingly, in embodiments, the node device(s) 16 in a plurality of systems, or each of a plurality of node devices 16 in a single system, may receive new whitelists or security filters from a hub device 32 that is configured to transmit the updated data to a plurality of node devices. The hub device may be central to the network(s)/system(s). In embodiments, the hub device 32 may be located at any point in a network/system, and may not be at a centre of the network. Coordination and distribution of whitelists may be provided by the hub device 32 wherever it is located in a network. In embodiments, the updated whitelists provided by the hub device 32 may be digitally signed and/or encrypted for authenticity. As shown in FIG. 12, a node device 16 may be configured to transmit feedback to a hub device 32, which may comprise data on which data packets it has distorted (step S100). This may provide the hub device 32 with useful information on the types of malicious data packets the node device 16 has encountered. The hub device 32 is configured to determine if one or more whitelists need to be updated in response to the feedback data (step S102). For example, if a node device 16 has encountered a malicious attack that other node devices 16 have not yet reported, the hub device 32 may update the whitelist or security filters so that all node devices 16 are aware of the new attack. The hub device 32 may transmit the updated whitelist(s) to the node device 16 (step S104).

In embodiments of the flow diagrams of FIGS. 10 to 12, monitoring a data packet at the node device may comprise monitoring data packets transmitted between a transmitter device and a receiver device over a serial communication bus. In particular embodiments, the serial bus may be an Ethernet or a Controller Area Network (CAN) bus. Alternatively, monitoring a data packet at the node device may comprise monitoring data packets transmitted between a transmitter device and a receiver device via an optical fibre.

Figure 13:
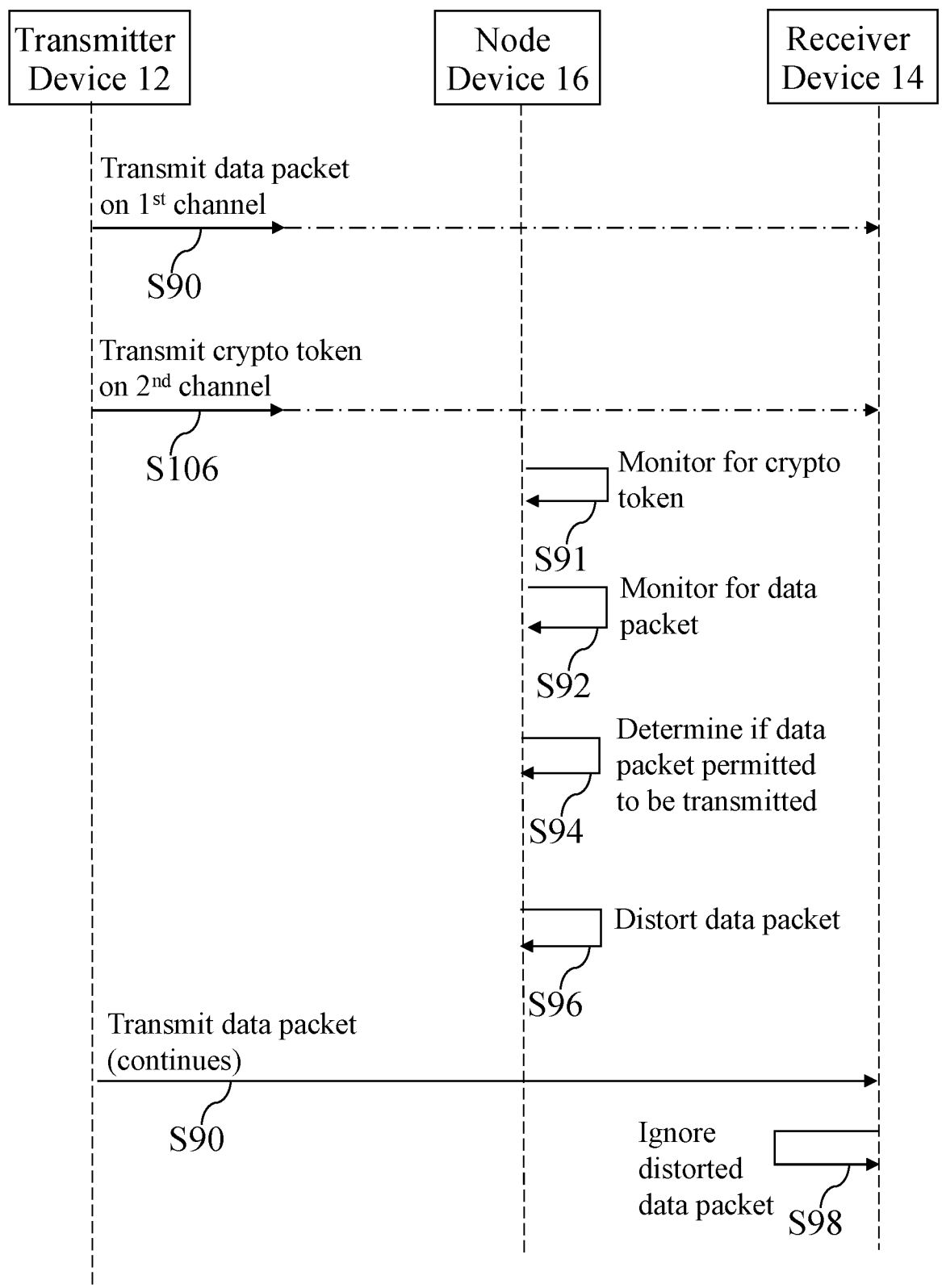
FIG. 13 shows a schematic flow diagram to filter and distort data packets transmitted over a wireless network.

FIG. 13 shows a schematic flow diagram to filter and distort data packets transmitted over a wireless network. A node device 16 provided between a transmitter device 12 and receiver device 14. The transmitter device 12 is configured to send data packets via a primary channel (step S90), and to send corresponding cryptographic tokens via a secondary channel (step S106). The node device 16 is configured to monitor for a cryptographic token (step S91) which is transmitted before the data packet, or is prepended to the data packet. The node device 16 also monitors for data packets transmitted from the transmitter device to the receiver device (step S92). If a cryptographic token was sent before, or prepended to, the detected data packet, the node device determines 16 if the cryptographic token corresponds to the data packet (step S94). In embodiments, the cryptographic token is a simple token which is easy and quick for the node device to determine as corresponding to the data packet (such that the node device can complete the determination before the data packet is entirely transmitted to the receiver device). For example, the cryptographic token may be based on the time that the data packet is transmitted, or a count, or on a cryptographic nonce. If the cryptographic token corresponds to the data packet, the node device may be configured to allow the data packet transmission to complete unaltered. If the node device 16 does not receive a corresponding cryptographic token on the secondary channel, the node device 16 may be configured to distort the data packet before transmission of the data packet is completed (step S96). The receiver 14 then receives a data packet which it is unable to interpret or unable to implement (step S98).

Embodiments of the present techniques also provide a non-transitory data carrier carrying code which, when implemented on a processor, causes the processor to carry out the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier—such as a disk, microprocessor, CD- or DVD-ROM, programmed memory such as read-only memory (firmware), or on a data carrier such as an optical or electrical signal carrier. The code may be provided on a carrier such as a disk, a microprocessor, CD- or DVD-ROM, programmed memory such as non-volatile memory (e.g. Flash) or read-only memory (firmware). Code (and/or data) to implement embodiments of the techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

Computer program code for carrying out operations for the above-described techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform the above-described method.

Embodiments of present techniques may be described in the following clauses:

1. A method of filtering data packets transmitted between a transmitter device and a receiver device, the method comprising: monitoring, at a node device arranged between the transmitter device and the receiver device, a data packet transmitted from the transmitter device to the receiver device; determining, at the node device, if the monitored data packet is permitted to be transmitted between the transmitter device and the receiver device; distorting, responsive to the determining, at the node device, at least part of the monitored data packet if the monitored data packet is not permitted to be transmitted.

2. The method in clause 1 wherein determining if the monitored data packet is permitted to be transmitted comprises analysing the monitored data packet before the entire monitored data packet is received by the receiver device.

3. The method in clause 1 or 2 wherein determining if the monitored data packet is permitted to be transmitted comprises analysing if the monitored data packet originates from a network segment that is expected to transmit data packets to the receiver device.

4. The method in any preceding clause wherein determining if the monitored data packet is permitted to be transmitted comprises analysing if the monitored data packet matches a pre-defined data packet that the receiver device is configured to receive.

5. The method in any preceding clause further comprising: switching, responsive to the determining and if the monitored data packet is not permitted to be transmitted, the node device from a passive monitoring mode to an active mode; and distorting, using the node device in active mode, at least part of the monitored data packet if the data packet is not permitted to be transmitted.

6. The method in any preceding clause further comprising: monitoring, at the node device, for a cryptographic token transmitted from the transmitter device to the receiver device; and monitoring, if a cryptographic token is transmitted, for the monitored data packet transmitted from the transmitter device to the receiver device.

7. The method in clause 6 further comprising: distorting, responsive to the monitoring, at the node device, at least part of the monitored data packet if the monitored data packet is not preceded by the cryptographic token.

8. The method in any preceding clause further comprising: monitoring, at the node device, for a cryptographic token transmitted from the transmitter device to the receiver device over a first communication channel; and monitoring, at the node device, for the monitored data packet transmitted from the transmitter device to the receiver device over a second communication channel.

9. The method in clause 8 further comprising: distorting, responsive to the monitoring, at the node device, at least part of the monitored data packet if the cryptographic token is not received on the first communication channel before transmission of the monitored data packet from the transmitter device to the receiver device is completed.

10. The method in any one of clauses 6 to 9 further comprising: determining, responsive to the monitoring, if the cryptographic token corresponds to the monitored data packet.

11. The method in clause 10 further comprising: distorting, responsive to the determining, at the node device, at least part of the data monitored packet if the cryptographic token does not correspond to the data packet.

12. The method in any preceding clause wherein distorting at least part of the monitored data packet comprises distorting a trailing checksum or cyclic redundancy check (CRC) value in the data packet, if the monitored data packet is not permitted to be transmitted.

13. The method in clause 12 wherein distorting the trailing checksum or CRC value comprises modifying the checksum or CRC value to an invalid value.

14. The method in any preceding clause wherein distorting the monitored data packet comprises distorting content of the data packet to prevent the monitored data packet being implemented by the receiver device, if the monitored data packet comprises a leading checksum or cyclic redundancy check (CRC) value.

15. The method in any preceding clause further comprising: receiving, at the node device, data defining one or more data packets that the receiver device is configured to receive.

16. The method in any preceding clause further comprising: receiving, at the node device, data defining one or more data packets that the transmitter device is configured to send.

17. The method in clause 15 or 16 wherein receiving data comprises receiving data, at the node device, from a hub device configured to transmit the data to a plurality of node devices.

18. The method in any preceding clause wherein monitoring a data packet at the node device comprises monitoring data packets transmitted between a transmitter device and a receiver device over a serial communication bus.

19. The method in clause 18 wherein the serial bus is an Ethernet or a Controller Area Network (CAN) bus.

20. The method in any preceding clause wherein monitoring a data packet at the node device comprises monitoring data packets transmitted between a transmitter device and a receiver device over a parallel communication bus or a multilane-serial bus.

21. The method in any preceding clause wherein monitoring a data packet at the node device comprises monitoring data packets transmitted between a transmitter device and a receiver device via an optical fibre.

22. The method in any preceding clause wherein monitoring a data packet at the node device comprises monitoring data packets transmitted between a transmitter device and a receiver device via a wireless communication protocol.

23. The method in any preceding clause wherein monitoring a data packet at the node device comprises monitoring data packets transmitted between a transmitter device and a receiver device in an automobile.

24. A method of filtering data packets transmitted between a transmitter device and a receiver device, the method comprising: monitoring, at a node device arranged between the transmitter device and the receiver device, a data packet transmitted from the transmitter device to the receiver device; determining, at a node device, if the monitored data packet is permitted to be transmitted between the transmitter device and the receiver device by checking if a cryptographic token was transmitted from the transmitter device to the receiver device before the monitored data packet was transmitted; and distorting, responsive to the monitoring, at the node device, at least part of the monitored data packet if the monitored data packet is not preceded by the cryptographic token and is not permitted to be transmitted.

25. The method in clause 24 further comprising: distorting, responsive to the determining, at the node device, at least part of the monitored data packet if the cryptographic token does not correspond to the monitored data packet.

26. The method in any one of clauses 24 or 25 wherein distorting at least part of the monitored data packet comprises distorting a trailing checksum or cyclic redundancy check (CRC) value in the monitored data packet, if the monitored data packet is not permitted to be transmitted.

27. The method in clause 26 wherein distorting the trailing checksum or CRC value comprises modifying the checksum or CRC value to an invalid value.

28. The method in any one of clauses 24 to 27 wherein distorting the monitored data packet comprises distorting content of the monitored data packet to prevent the data packet being implemented by the receiver device, if the monitored data packet comprises a leading checksum or cyclic redundancy check (CRC) value.

29. An apparatus for filtering data packets transmitted between a transmitter device and a receiver device, the apparatus comprising: an interface configured to monitor a data packet transmitted from the transmitter device to the receiver device; and at least one processor configured to: determine if the monitored data packet is permitted to be transmitted between the transmitter device and the receiver device, and distort, responsive to the determining, at least part of the monitored data packet if the monitored data packet is not permitted to be transmitted.

30. The apparatus in clause 29 further comprising a data store configured to store: pre-defined data on data packets that the transmitter device is configured to send; and pre-defined data on data packets that the receiver device is configured to receive; wherein the processor is configured to determine if the monitored data packet is permitted to be transmitted between the transmitter device and the receiver device by comparing the monitored data packet to the pre-defined data in the data store.

31. The apparatus in any one of clauses 29 or 30 wherein the apparatus is provided within an automobile.

32. A system for filtering data packets, the system comprising: a transmitter device and a receiver device arranged in communication via a communication channel; and a node device arranged between the transmitter device and the receiver device and configured to: monitor a data packet transmitted from the transmitter device to the receiver device over the communication channel; determine if the monitored data packet is permitted to be transmitted between the transmitter device and the receiver device; and distort, responsive to the determining, at least part of the monitored data packet if the monitored data packet is not permitted to be transmitted.

33. The system in clause 32 wherein the communication channel is a serial communication bus.

34. The system in clause 32 wherein the communication channel is an Ethernet or a Controller Area Network (CAN) bus.

35. The system in clause 32 wherein the communication channel is an optical fibre.

36. The system in clause 32 wherein the communication channel is a wireless communication channel.

37. The system in any one of clauses 32 to 36 wherein the node device may be any one of: a gateway, a bus repeater, an optical fibre repeater, a network hub, a network router, or a network switch.

38. An apparatus for filtering data packets transmitted between a transmitter device and a receiver device, the apparatus comprising: means for monitoring a data packet transmitted from the transmitter device to the receiver device; means for determining if the monitored data packet is permitted to be transmitted between the transmitter device and the receiver device; and means for distorting, responsive to the determining, at least part of the monitored data packet if the monitored data packet is not permitted to be transmitted.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from the any inventive concept as defined in the appended claims.

The invention claimed is:

1. A method of filtering data packets transmitted between a transmitter device and a receiver device, the method comprising:
    monitoring, at a node device arranged between the transmitter device and the receiver device, a data packet transmitted from the transmitter device to the receiver device;
    determining, at the node device, if the monitored data packet is permitted to be transmitted between the transmitter device and the receiver device by:
        determining whether a cryptographic token corresponding to the monitored data packet was transmitted before or is prepended to the monitored data packet,
        wherein if a cryptographic token was not transmitted before or is not prepended to the monitored data packet, the monitored data packet is not permitted to be transmitted; and
    distorting, responsive to the determining, at the node device, at least part of the monitored data packet if the monitored data packet is not permitted to be transmitted,
    wherein determining if the monitored data packet is permitted to be transmitted includes analysing if the monitored data packet originates from a network segment that is expected to transmit data packets to the receiver device.

2. The method as claimed in claim 1 wherein determining if the monitored data packet is permitted to be transmitted comprises analysing the monitored data packet before the entire monitored data packet is received by the receiver device.

3. The method as claimed in claim 1 wherein determining if the monitored data packet is permitted to be transmitted comprises analysing if the monitored data packet matches a pre-defined data packet that the receiver device is configured to receive.

4. The method as claimed in claim 1 further comprising:
    switching, responsive to the determining and if the monitored data packet is not permitted to be transmitted, the node device from a passive monitoring mode to an active mode; and
    distorting, using the node device in active mode, at least part of the monitored data packet if the data packet is not permitted to be transmitted.

5. The method as claimed in claim 1 further comprising:
    monitoring, at the node device, for a cryptographic token transmitted from the transmitter device to the receiver device; and
    monitoring, if a cryptographic token is transmitted, for the monitored data packet transmitted from the transmitter device to the receiver device.

6. The method as claimed in claim 5 further comprising:
    distorting, responsive to the monitoring, at the node device, at least part of the monitored data packet if the monitored data packet is not preceded by the cryptographic token.

7. The method as claimed in claim 1 further comprising:
    monitoring, at the node device, for a cryptographic token transmitted from the transmitter device to the receiver device over a first communication channel; and
    monitoring, at the node device, for the monitored data packet transmitted from the transmitter device to the receiver device over a second communication channel.

8. The method as claimed in claim 7 further comprising:
    distorting, responsive to the monitoring, at the node device, at least part of the monitored data packet if the cryptographic token is not received on the first communication channel before transmission of the monitored data packet from the transmitter device to the receiver device is completed.

9. The method as claimed in claim 5 further comprising:
    determining, responsive to the monitoring, if the cryptographic token corresponds to the monitored data packet.

10. The method as claimed in claim 9 further comprising:
    distorting, responsive to the determining, at the node device, at least part of the data monitored packet if the cryptographic token does not correspond to the data packet.

11. The method as claimed in claim 1 wherein distorting at least part of the monitored data packet comprises distorting a trailing checksum or cyclic redundancy check (CRC) value in the data packet, if the monitored data packet is not permitted to be transmitted.

12. The method as claimed in claim 11 wherein distorting the trailing checksum or CRC value comprises modifying the checksum or CRC value to an invalid value.

13. The method as claimed in claim 1 wherein distorting the monitored data packet comprises distorting content of the data packet to prevent the monitored data packet being implemented by the receiver device, if the monitored data packet comprises a leading checksum or cyclic redundancy check (CRC) value.

14. The method as claimed in claim 1 further comprising:
    receiving, at the node device, data defining one or more data packets that the receiver device is configured to receive.

15. The method as claimed in claim 1 further comprising:
receiving, at the node device, data defining one or more data packets that the transmitter device is configured to send.

16. The method as claimed in claim 14 wherein receiving data comprises receiving data, at the node device, from a hub device configured to transmit the data to a plurality of node devices.

17. An apparatus for filtering data packets transmitted between a transmitter device and a receiver device, the apparatus comprising:
an interface configured to monitor a data packet transmitted from the transmitter device to the receiver device; and
at least one processor configured to:
determine if the monitored data packet is permitted to be transmitted between the transmitter device and the receiver device by:
determining whether a cryptographic token corresponding to the monitored data packet was transmitted before or is prepended to the monitored data packet,
wherein if a cryptographic token was not transmitted before or is not prepended to the monitored data packet, the monitored data packet is not permitted to be transmitted, and
distort, responsive to the determining, at least part of the monitored data packet if the monitored data packet is not permitted to be transmitted,
wherein determining if the monitored data packet is permitted to be transmitted includes analysing if the monitored data packet originates from a network segment that is expected to transmit data packets to the receiver device.

18. The apparatus as claimed in claim 17 further comprising a data store configured to store:
pre-defined data on data packets that the transmitter device is configured to send; and
pre-defined data on data packets that the receiver device is configured to receive;
wherein the processor is configured to determine if the monitored data packet is permitted to be transmitted between the transmitter device and the receiver device by comparing the monitored data packet to the pre-defined data in the data store.

19. A system for filtering data packets, the system comprising:
a transmitter device and a receiver device arranged in communication via a communication channel; and
a node device arranged between the transmitter device and the receiver device and configured to:
monitor a data packet transmitted from the transmitter device to the receiver device over the communication channel;
determine if the monitored data packet is permitted to be transmitted between the transmitter device and the receiver device by:
determining whether a cryptographic token corresponding to the monitored data packet was transmitted before or is prepended to the monitored data packet,
wherein if a cryptographic token was not transmitted before or is not prepended to the monitored data packet, the monitored data packet is not permitted to be transmitted; and
distort, responsive to the determining, at least part of the monitored data packet if the monitored data packet is not permitted to be transmitted,
wherein determining if the monitored data packet is permitted to be transmitted includes analysing if the monitored data packet originates from a network segment that is expected to transmit data packets to the receiver device.

\* \* \* \* \*